United States Patent [19]

Schilling

[11] 4,142,793

[45] Mar. 6, 1979

[54] VARIABLE SPEED DRIVE APPARATUS FOR THE SCANNING SYSTEM OF A COPY MACHINE

[75] Inventor: Robert J. Schilling, St. Paul, Minn.

[73] Assignee: Minnesota Mining and Manufacturing Company, St. Paul, Minn.

[21] Appl. No.: 859,039

[22] Filed: Dec. 9, 1977

[51] Int. Cl.$^2$ ........................ G03G 15/00; G03B 27/36

[52] U.S. Cl. ........................................................ 355/58

[58] Field of Search ........................ 355/57, 58, 66, 60, 355/8, 11, 3 R

[56] References Cited

U.S. PATENT DOCUMENTS

| | | | |
|---|---|---|---|
| 3,614,222 | 10/1971 | Post et al. | 355/8 |
| 3,897,148 | 7/1975 | Ritchie et al. | 355/57 |
| 4,032,231 | 6/1977 | Zucker | 355/60 |
| 4,035,075 | 7/1977 | Sprado | 355/66 |

*Primary Examiner*—Donald A. Griffin

*Attorney, Agent, or Firm*—Cruzan Alexander; Donald M. Sell; Robert C. Beck

[57] ABSTRACT

A copy machine for reproducing original size, reduced or magnified copies of an original document is disclosed. The original document is supported on a transparent support surface. An optical scanning system is moved past the original document and an image of the document is transmitted to a photosensitive surface which is moved at constant speed. The speed of the optical scanning system is related to the magnification ratio. The scanning system is driven by a plurality of cams mounted upon a common cam shaft. Scanning speed is selected by coupling the scanning system to one of the plurality of cams.

5 Claims, 3 Drawing Figures

VARIABLE SPEED DRIVE APPARATUS FOR THE SCANNING SYSTEM OF A COPY MACHINE

BACKGROUND OF THE INVENTION (1) Field of the Invention

This invention relates to a drive apparatus for varying the speed of a scanning system for use with copying machines, which utilize variations in scanning speed to change the magnification of the reproduced image.

(2) Description of the Prior Art

It is common in optical copying machines to place a document upon a transparent support platen and to transfer an image of this document by incrementally scanning the document. By varying the rate at which the document is scanned, an enlarged or reduced copy of the document can be produced.

U.S. Pat. No. 4,035,075 to Charles G. Sprado assigned to Minnesota Mining and Manufacturing Company, shows a scanning system which may be adapted to produce variable magnification copies. The scanning system of Sprado is driven by one cam. The chief advantage of cam drive means associated with moving scanning carriages is close control over the position, velocity and acceleration of the carriages which results in a reduction in vibration and shock associated with carriage movement.

SUMMARY OF THE INVENTION

The present invention provides an improved variable speed drive system for driving the scanning system of a copying machine. The original document is placed on a transparent support platen. The scanning system transmits an image of the document to a photosensitive surface which moves at constant speed.

One form of scanning system which may be adapted to variable speed operation transmits an image of a stationary original document by reflection from mirrored surfaces carried on first and second carriages. In this system, the carriages are arranged to scan the length of the document and are carried by a pair of guide rails attached to the frame of the machine. The carriages are interconnected such that the second carriage moves twice the distance of the first carriage in the same direction as the first carriage.

A main cam follower arm is pivotally mounted to the machine frame and carries a transversely mounted latch bar. The first carriage is connected to a main cam follower arm by an articulated drive link. Auxiliary cam follower arms are pivotally mounted to the machine frame. The auxiliary cam follower arms have solenoid operated latch hooks which allow each auxiliary cam follower arm to be selectively coupled to the latch bar on the main cam follower arm. A cam is associated with each cam follower arm. These cams are mounted on a rotatable cam shaft. Each cam profile corresponds to a discrete enlargement or reduction ratio. When a desired magnification ratio is selected the cam which provides the appropriate scanning speed is selectively engaged to the main follower arm by actuation of the appropriate solenoids. The main cam follower arm then transmits this motion to the first carriage through a drive link. Although the operation of the variable speed drive apparatus is illustrated with a specific scanning system, it is understood that the invention may be used with scan systems which use a moving support platen, or a moving lens, or mirror or other scanning system.

DESCRIPTION OF THE PREFERRED EMBODIMENTS

The present invention relates to an improved variable speed drive apparatus for a copy machine, scanning system. In the preferred embodiment an original document to be copied is placed on a stationary transparent support platen and illuminated. The image of the document is transferred to a photosensitive member such as a layer of photoconductive material deposited on the surface of a rotatable drum. The image is then developed upon this drum electrophotographically by image forming powders which are transferred from the drum to a receptor sheet. The invention provides a means by which the image transferred to the photosensitive member may be the same size as the original document or enlarged or reduced with respect to the original document. Magnification or reduction of the original document is achieved by varying the rate at which the image of the document is scanned, the appropriate rate at which the image is scanned is determined by the position of the lens system in relation to the transparent support platen.

When an original size copy is desired, the lens is positioned such that the object size and image size are identical. In the enlargement mode, the lens assembly is positioned closer to the transparent support platen and the scanning speed must be reduced to provide a blur-free image of the document on the photosensitive drum. In the reduction mode, the lens assembly is placed farther from the transparent support platen and the scanning speed must be correspondingly increased to provide a blur-free image on the photosensitive drum.

In operation, the lens assembly is positioned according to the desired magnification factor. Then, the appropriate cam profile is selectively engaged to the first carriage, at which time the apparatus is ready to being its scanning cycle.

Figure 1:
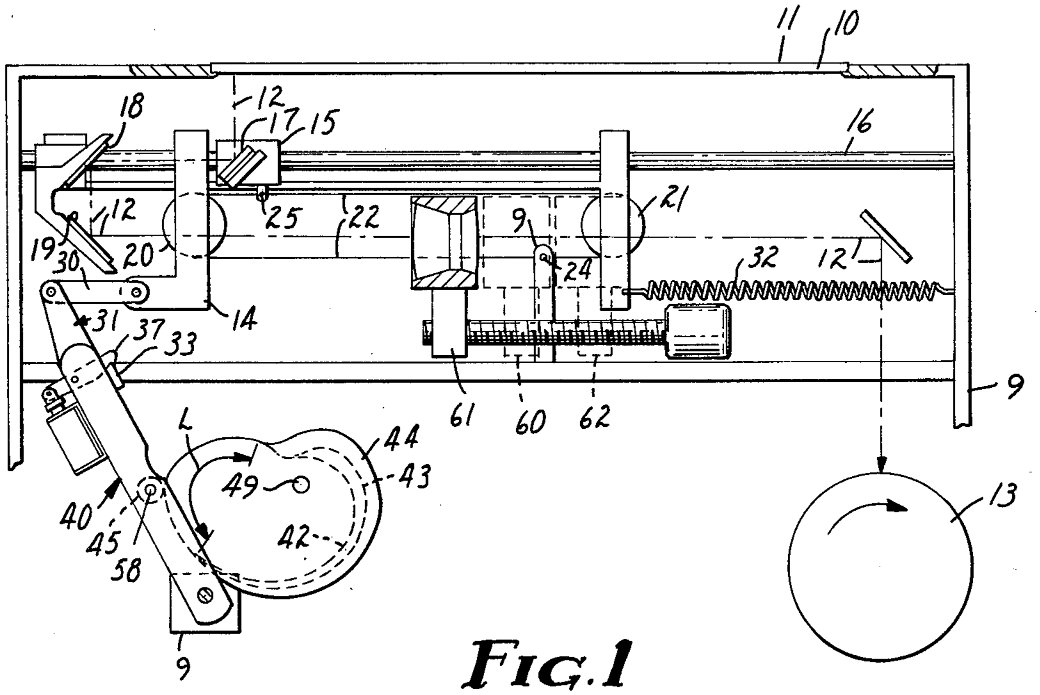
FIG. 1 shows a schematic elevation of the copying machine, with the carriages in the home position.

Referring to FIG. 1, which schematically illustrates the exposure device of a copying machine as well as a schematic representation of a three speed scanning apparatus embodying the present invention, there is shown a document 11 resting upon a transparent platen 10. Beneath this support 10 and parallel to the plane thereof are a pair of transversely spaced guide rails 16—16. A first carriage 14 and a second carriage 15 are adapted to slide along the guide rails. The image shown schematically by ray 12 is transferred from the document 11 to a photosensitive drum 13 by reflection from surface 17 of the second carriage to a mirror pair 18, 19 on the first carriage. The image is transferred through a lens assembly mounted on a movable support to the photoconductive drum. The first and second carriages are interconnected such that movement of the first carriage causes the second carriage to move in the same direction as the first carriage but twice the distance. This interconnection may be conveniently formed by a pair of pulley wheels 20, 21 which are mounted on the first carriage 14. A cable 22 passing over the pulley wheels is anchored to the frame of the machine 9 by an anchor 24. The second carriage 15 is joined to the cable at point 25.

Cam motion is coupled to the first carriage through connecting link 30 which is connected to a main follower arm 31. A spring 32 is connected between the frame of the machine and the first carriage 14 to provide sufficient biasing force to ensure that the carriages accurately follow the selected cam profile.

A plurality of cams 42, 43, 44 are mounted on cam shaft 49. Cam 42 which is associated with the main cam follower arm 31 is referred to as the main cam. The motion of any of the plurality of cam lobes may be connected to the main follower arm 31 by actuation of the appropriate solenoids. Each of the cam lobes has a displacement profile which is identical over the distance L. This portion of the cam profile controls the return stroke of the carriage to the home position. When cam followers 45, 46 and 47 are traversing this distance L, as shown in FIG. 1, the latch hooks 37, 38 pivotably mounted on the auxiliary cam follower arms 40, 41 will latch onto latch bar 33 mounted upon main cam follower arm 31, if solenoids 50 and 51 are not energized. In this condition, the main follower arm will follow the motion described by the displacement of auxiliary cam follower 45 and its associated cam 44. During a considerable portion of cam travel, cam followers 46, 47 will be lifted from their associated cams 43, 42 and the motion of the first carriage will be determined by cam 44. During the enlargement reproduction mode, associated with cam 44, the lens assembly 63 will be moved to position 61.

Figure 2:
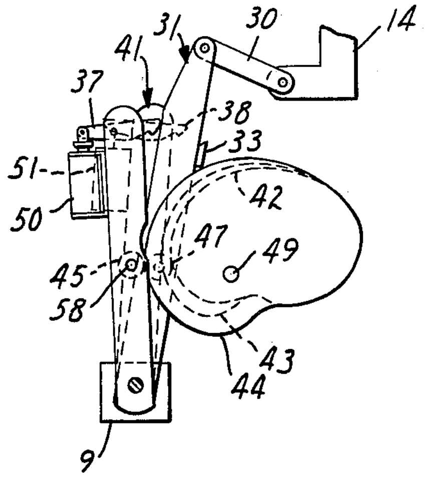
FIG. 2 shows a schematic elevation of the variable speed cam drive system with the fastest speed cam engaged.

FIG. 2 shows the variable speed scanning system in the reduction mode. In this mode, the first carriage must follow the displacement profile of cam 42 to scan the document at high speed. This cam profile may be selectively engaged by energizing solenoids 50 and 51 during the return stroke. This will ensure that hooks 37 and 38 will not engage latch bar 33 when the cam followers 45 and 46 are traversing distance L of the cam profiles. Consequently, cam follower 47 will follow the displacement profile of cam 42 during the reproduction cycle. When the reduction mode is selected, the lens is moved to position 62, then an electrical signal is sent to solenoids 50 and 51 which lift latch hooks 37 and 38 away from latch bar 33, thus permitting cam follower 47 to contact cam lobe 42. In this mode, main cam follower arm follows the contour of cam 42.

When an original sized copy is desired, the lens system is moved to position 60. The appropriate cam profile for this magnification ratio is cam 43. The motion of cam 43 may be selectively transferred to the main follower arm 31 by energizing solenoid 50 on auxiliary follower arm 40 during the return stroke of the carriages. In this mode, latch hook 38 will engage latch bar 33 and cam follower 46 attached to axuiliary cam follower arm 41 will follow the cam profile of cam 43. During the scan portion of the cycle, cam follower 47 will be lifted away from the surface of cam 42 and the main follower arm will follow the motion of cam follower 46. During the scan cycle, cam follower 45 will rest upon cam lobe 44. However, this auxiliary follower arm will not be latched to latch bar 33.

Figure 3:
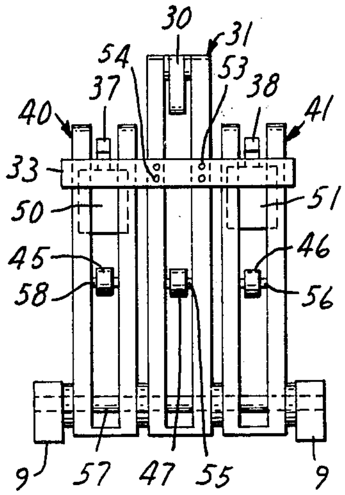
FIG. 3 shows a traverse vertical sectional view of the cam follower arms and associated mechanisms taken along line 3—3 of FIG. 2.

FIG. 3 shows the cam follower arms and their associated mechanisms in elevation as they would be seen from the position occupied by the cams. The solenoid latch mechanisms are positioned as in FIG. 2. This view shows the structure of the main cam follower arm 31. The cam follower 47 is rotatably mounted on axle 55 which is located between the pair of arm structures which form the main cam follower arm 31. Latch bar 33 is mounted to follower arm 31 by suitable means such as screws 53, 54. Connecting link 30 is shown pivotably mounted above latch bar 33. The main follower arm is shown pivotably mounted on an axle 57 which is attached to the frame 9 of the copying machine. Main follower arm 31 is flanked on one side by auxiliary cam follower arm 41. The pair of arm structures which form the auxiliary cam follower arm are pivotably mounted on axle 57. Cam follower 46 is mounted for rotation on an axle 56 which is carried between the arm structures. Latch hook 38 is pivotably mounted between the arm structures and is actuated by solenoid 51 which is attached to the rear of the arm structures. When this solenoid is actuated latch hook 38 is lifted up and it will not engage latch bar 33. The main cam follower arm 31 is flanked on the other side by auxiliary cam follower arm 40. This arm is formed by a pair of arm structures pivotally mounted on axle 57. Cam follower 45 is mounted for rotation on axle 58.

Latch hook 37 is pivotally mounted between the arm structures and is actuated by solenoid 50 which is mounted on the arm structure. When this solenoid is energized latch hook 37 is lifted away from latch bar 33 as shown in FIG. 3.

Although the variable speed drive system has been described in combination with a dual carriage scanning system, the invention can be used to drive other scanning systems without departing from the scope and spirit of the invention.

Also, the variable speed drive system has been described in reference to a scanning system useful for producing original size, enlarged and reduced size copies of an original document. However, it is clear that the selection of magnifiction ratio is arbitrary and any number of discrete magnification ratios can be provided by supplying additional cams and cam followers.

What is claimed is:

1. In a copying machine for producing variable magnification copies of an original document, a variable speed drive apparatus for driving an optical scanning system at a selected speed, said copying machine including a transparent document support platen, a photosensitive receptor surface adapted to move at constant speed, an optical scanning system for transmitting an image of said original document on said transparent support platen to said photosensitive receptor surface, said variable speed drive apparatus comprising a plurality of cams mounted for rotation with a common cam shaft, a plurality of cam follower arms, one of said arms being associated with each of said cams, and a plurality of selectively engageable latch means for coupling a selected follower arm to said optical scanning system.

2. In a copying machine for producing variable magnification copies of an original document, a variable speed drive apparatus for driving an optical scanning system at a selected speed, said copying machine including a copying machine frame, a transparent document support platen, a photosensitive receptor surface driven at constant speed with respect to said copy machine frame, an optical scanning system for transmitting an image of said original document on said transparent document support platen to said photosensitive receptor surface, said variable speed drive apparatus comprising a cam shaft mounted for constant speed rotation on said copy machine frame and carrying a main cam and at least one auxiliary cam, a main cam follower arm pivotally mounted to said copy machine frame and associated with said main cam, at least one auxiliary cam follower arm pivotally mounted to said copy machine frame, each of said auxiliary cam follower arms being positioned to engage with one said auxiliary cam, and selectively engageable latch means for selectively coupling each of said auxiliary cam follower arms to said main cam follower arm for coupling the motion of a selected auxiliary cam to said main cam follower arm such that said main cam follower arm follows the motion of said selected auxiliary cam.

3. The apparatus of claim 2 wherein said selectively engageable latch means comprises a latch bar mounted on said main cam follower arm, a latch hook pivotally mounted on each of said auxiliary cam follower arms for engaging said latch bar, and a solenoid mounted on each of said auxiliary cam follower arms adapted to actuate each of said latch hooks in response to an electrical signal.

4. The apparatus of claim 3 wherein said main cam and said auxiliary cams have substantially identical profiles over a portion of their surfaces.

5. In a copying machine for producing variable magnification copies of an original document, a scanning apparatus for scanning a stationary transparent support platen at a selected speed comprising a copying machine frame, a pair of guide rails, a movable lens assembly, a moving photosensitive surface, a first carriage supported on said guide rails and adapted to travel along a path parallel to said transparent stationary support platen, a second carriage supported on said guide rails adapted to travel along a path parallel to said transparent stationary support platen, said first carriage carrying mirrors to transmit an image of said original document received from said second carriage through said lens assembly to a said photosensitive surface, said second carriage carrying a mirror to transmit an image of said original document to said first carriage, linkage means interconnecting said first and second carriage means such that motion imparted to said first carriage means drives said second carriage means in the same direction of said first carriage means at a speed which is twice the speed of the first carriage means, a main cam follower arm pivotally mounted to said frame, a drive link for mechanically coupling said main cam follower arm to said first carriage, at least one of auxiliary cam follower arm pivotally mounted to said frame, a cam shaft rotatably mounted to said frame carrying a main cam and at least one auxiliary cam associated respectively with said main cam follower and said auxiliary cam follower arm, and selectively engageable latch means for selectively coupling each of said auxiliary cam follower arms to said main cam follower arm for coupling the motion of a selected auxiliary cam to said main cam follower arm such that the motion of a selected cam is transmitted to said first carriage through said drive link comprising a latch bar mounted on said main cam follower arm, a latch hook pivotally mounted on each of said auxiliary cam follower arms for engaging said latch bar, and a solenoid mounted on each of said auxiliary cam follower arms adapted to actuate each of said latch hooks in response to an electrical signal.

* * * * *